United States Patent
Tomatis

(10) Patent No.: US 10,806,120 B2
(45) Date of Patent: Oct. 20, 2020

(54) CURD KNEADING MACHINE FOR THE PRODUCTION OF PULLED-CURD CHEESES

(71) Applicant: CMT COSTRUZIONI MECCANICHE E TECNOLOGIA SPA, Peveragno (IT)

(72) Inventor: Stefano Tomatis, Peveragno (IT)

(73) Assignee: CMT COSTRUZIONI MECCANICHE E TECNOLOGIA SPA, Peveragno (IT)

( * ) Notice: Subject to any disclaimer, the term of this patent is extended or adjusted under 35 U.S.C. 154(b) by 661 days.

(21) Appl. No.: 15/456,639

(22) Filed: Mar. 13, 2017

(65) Prior Publication Data

US 2017/0258031 A1  Sep. 14, 2017

(30) Foreign Application Priority Data

Mar. 14, 2016 (IT) .......................... 102016000026211

(51) Int. Cl.
*A01J 25/00* (2006.01)

(52) U.S. Cl.
CPC .................................. *A01J 25/008* (2013.01)

(58) Field of Classification Search
CPC ........ A01J 25/008; A01J 25/00; A47J 37/044; A47J 31/404
USPC .......... 99/326, 348, 355, 451, 453, 467, 483
See application file for complete search history.

(56) References Cited

U.S. PATENT DOCUMENTS

2012/0097048 A1*  4/2012  Tomatis ................ A01J 25/008
                                                                  99/453

FOREIGN PATENT DOCUMENTS

| EP | 0146765 A2 | 7/1985 |
| EP | 2243378 A1 | 10/2010 |
| EP | 2473028 B1 | 8/2013 |
| RU | 2 496 308 C2 | 10/2013 |
| RU | 2 511 336 C2 | 10/2014 |

OTHER PUBLICATIONS

Italian Search Report and Written Opinion dated Nov. 15, 2016 issued in IT UA20161606.
Russian Office Action dated May 21, 2020 received in Russian Patent Application No. 2018136102110(059646).

* cited by examiner

*Primary Examiner* — Phuong T Nguyen
(74) *Attorney, Agent, or Firm* — Scully, Scott, Murphy & Presser, P.C.

(57) ABSTRACT

A kneading channel is provided with an inlet end which is open to receive curd to be kneaded and an outlet end which is open to dispense the curd; a pair of counter-rotating mutually opposite motorized augers, arranged side by side in the kneading channel, move the curd toward outlet end; steam injector elements are opened in the kneading channel; a kneading chamber, which receives the curd from the outlet of the kneading channel, accommodates a motorized spindle with a vertical axis which has rotating arms that cooperate with the fixed arms.

10 Claims, 4 Drawing Sheets

CURD KNEADING MACHINE FOR THE PRODUCTION OF PULLED-CURD CHEESES

The present invention relates to a curd kneading machine for the production of "pasta filata" or pulled-curd cheeses.

As is known, in the production of pulled-curd cheeses the curd is made plastic or "stringy" by soaking it typically with hot water until it reaches a temperature of at least 60° C. After this, the stringy curd is pulled in order to obtain a fibrous curd. This is then reduced to globoid or cylindrical shapes, which are then firmed by cooling.

Usually, the kneading is done by introducing the previously-crumbled curd into a kneading chamber, into which hot water is also fed. In the kneading chamber, plunger arms operate which mix and pull the curd that is progressively produced by the mixture of curd and hot water. The kneaded curd that is created in the kneading chamber is progressively dispensed toward subsequent operations for forming, while the excess water is drained from the kneading chamber by way of an overflow opening.

In such process it is however inevitable that the hot water for kneading dissolves water-soluble nutritious substances therein, such as fats, albumin or glucose, which are generally contained in small quantities in the curd to be kneaded. The draining of the water through the overflow entails, therefore, the loss of these substances as well.

Such circumstance is unwelcome not only because it reduces the production yield, but also because the water to be disposed of must first be skimmed in order to recover these substances, and then purified so that it can be drained in conformance with the regulations on environmental pollution, with consequent complications in the process.

Another drawback of the machine with plunger arms described above is that the heating of the water, which is used in high percentages (around two parts water are used for one part curd), implies a considerable energy expenditure, with consequent increase of the production costs.

In other types of conventional machines it has been attempted to knead the curd by way of augers. However, the operation of such machines is discontinuous and therefore they have reduced productivity.

EP 2473028 B1 of this same Applicant discloses a kneading apparatus that comprises a first kneading station in which the curd is kneaded by way of augers, and a second kneading station in which the curd is subjected to a finishing kneading by way of plunging arms.

In both stations steam is introduced, so as to progressively heat the curd and make it stringy or plastic. Since steam amalgamates more easily and uniformly with the curd with respect to water, such steam heating system considerably reduces the quantity of water released.

EP 2473028 B1 also provides for the possibility of installing multiple kneading chambers with plunging arms connected in series.

Although the apparatus disclosed in EP 2473028 B1 is greatly appreciated in the sector in terms of yield and quality of production, it is now desirable to provide a kneading machine that is particularly, although not exclusively, adapted to the production of relatively "dry" pulled curds, e.g., with moisture level less than 55%, and which with respect to the above mentioned apparatus is more compact, has low manufacturing costs, and low energy consumption.

The aim of the present invention is therefore to provide a curd kneading machine for the production of pulled-curd cheeses which, although retaining the advantages of the apparatus known from EP 2473028 B1 in terms of yield and quality of production, meets the new requirements shown above.

Within this aim, an object of the invention is to provide a kneading machine that is capable of operating continuously, so as to maintain high productivity and high production yield.

This aim and this and other objects which will become clearer from the description that follows, are achieved by the curd kneading machine having the characteristics recited in the appended claim 1, while the appended dependent claims define other characteristics of the invention which are advantageous, although secondary.

Now the invention will be described with reference to a preferred but not exclusive embodiment thereof, which is illustrated for the purposes of non-limiting example in the accompanying drawings, wherein.

Figure 1:
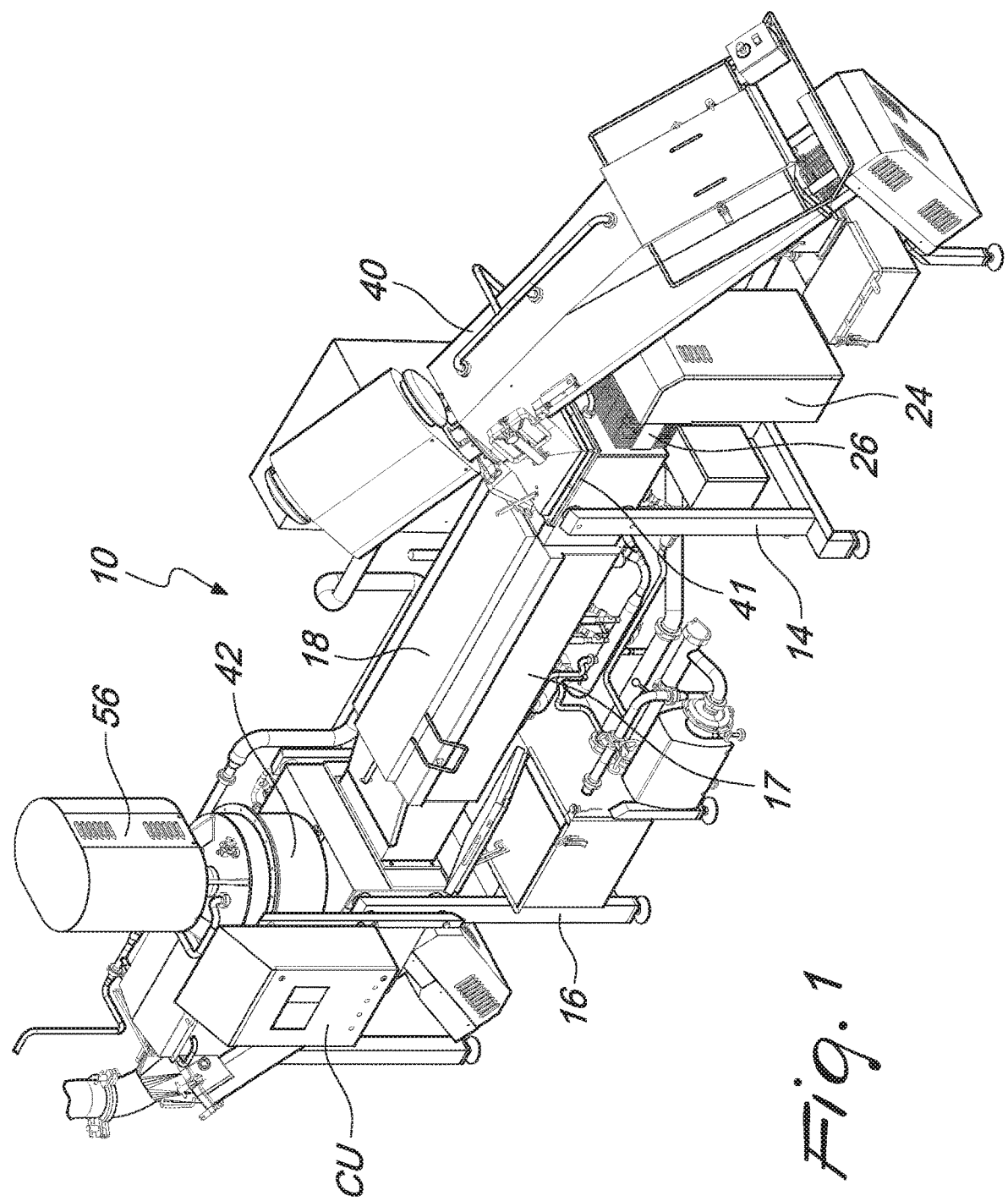
FIG. 1 is a perspective view of the kneading machine according to the invention.

With reference to the figures, a kneading machine 10, adapted to be supplied with curd, comprises a kneading channel 12 supported at opposite ends by pedestals 14, 16. The kneading channel 12 is surrounded by a shell 17 which is closed in an upper region by a lid 18.

Figure 3:
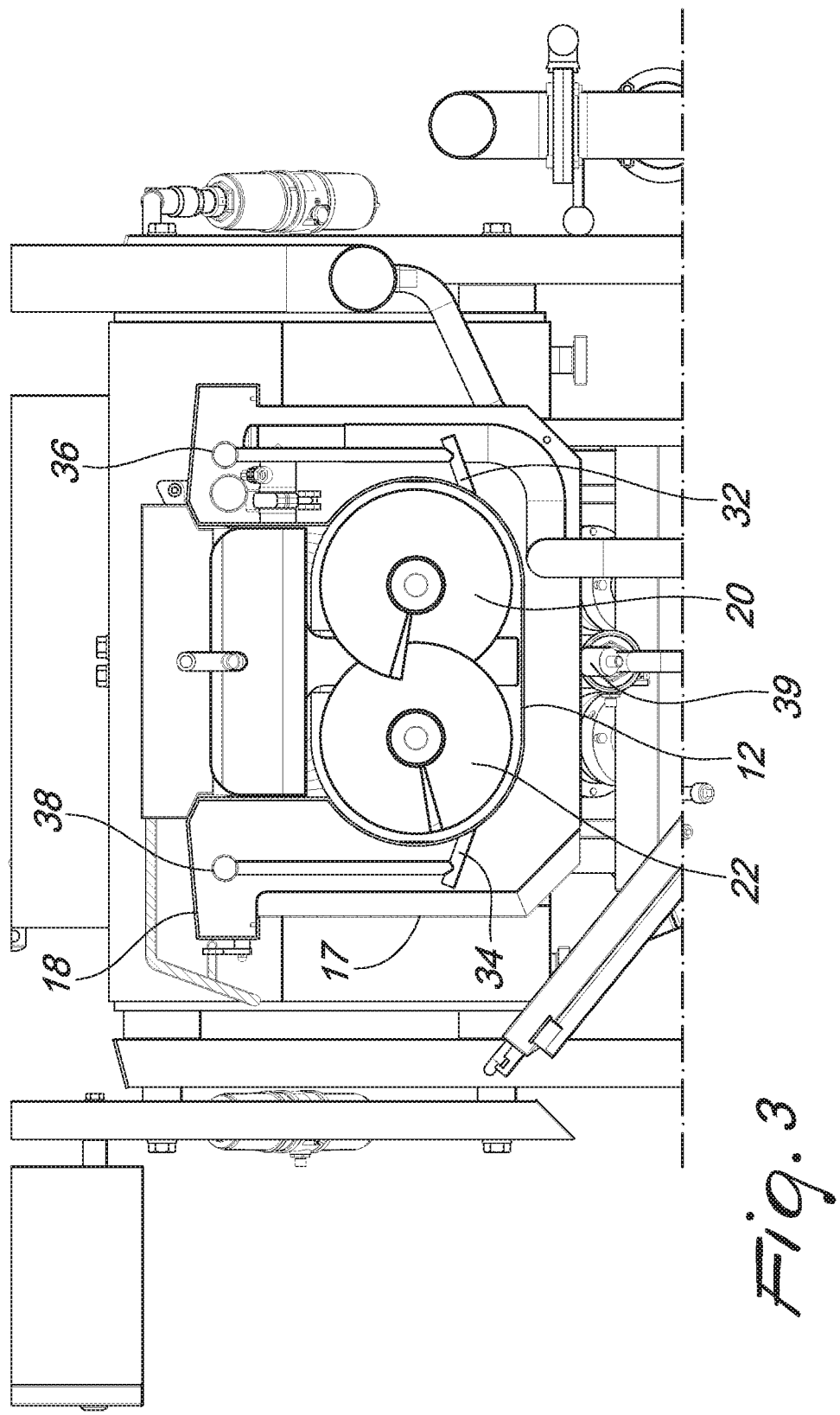
FIG. 3 is a cross-sectional view taken along the line III-III of FIG. 2.

Inside the kneading channel 12 a pair of augers 20, 22 are supported, arranged side by side and parallel. The augers 20, 22 have their respective helices which rotate in opposite directions and are partially inserted in each other. As illustrated in detail in FIG. 3, the kneading channel 12 has a profile such that it closely surrounds the augers 20, 22 on mutually opposite flanks.

The augers 20, 22 are made to rotate in opposite directions by a first gearmotor which is protected by a housing 24, by way of transmission means 26.

As illustrated in FIG. 1, the kneading channel 12 and the augers 20, 22 are inclined slightly downward at an angle advantageously comprised between 0.5° and 6°, preferably 1.5°, from an inlet end 12a to an outlet end 12b of the channel.

Figure 2:
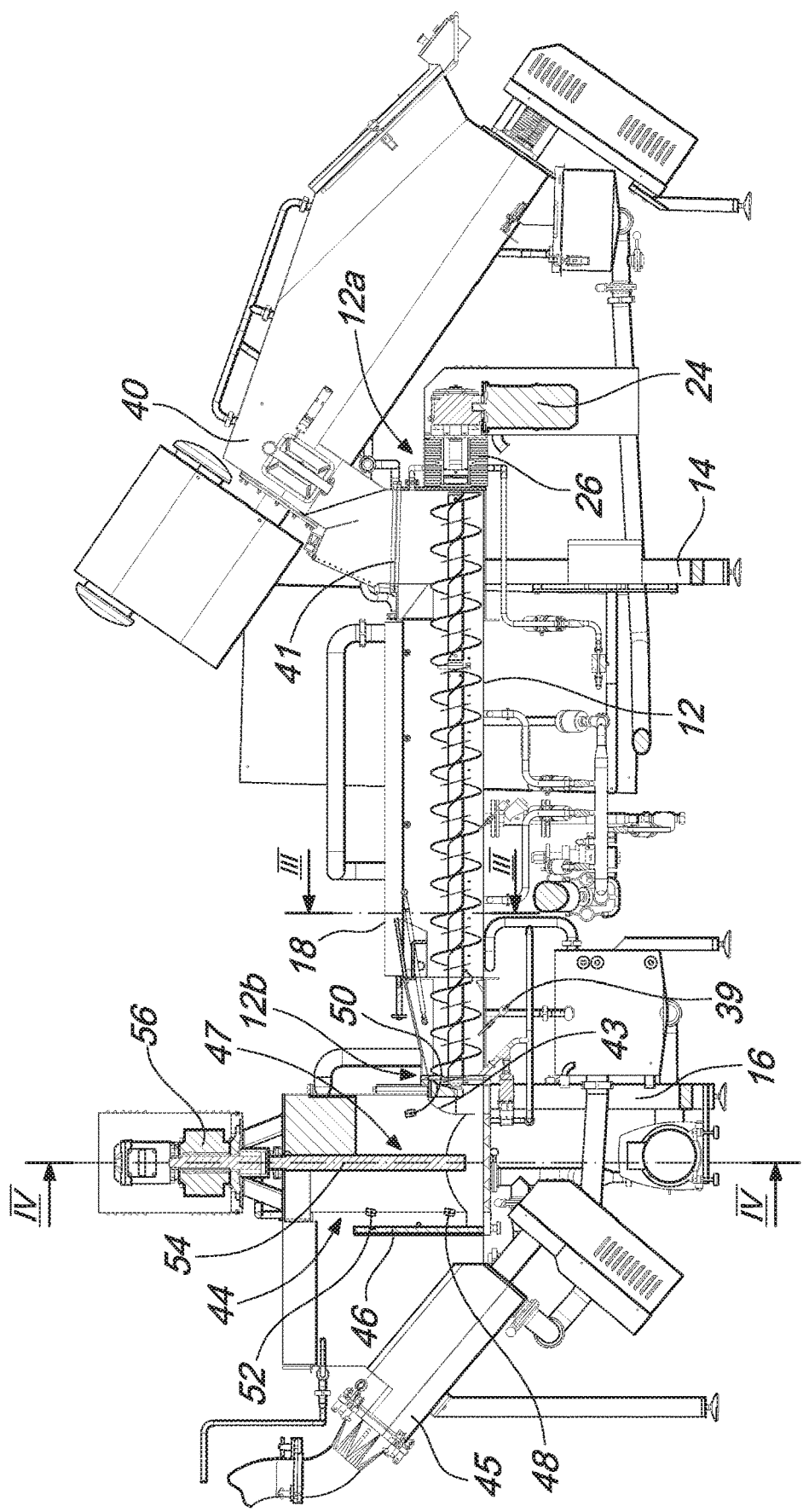
FIG. 2 is a partially cross-sectional side view of the kneading machine according to the invention.

Two rows of injectors 32, 34 (FIGS. 2 and 3) arrayed on the opposite sides of the kneading channel 12 feed steam into the channel. To this end, the injectors 32, 34 are connected to a steam source (not shown) by way of respective ducts 36, 38. A thermal probe 39 (FIGS. 2 and 3) detects the temperature in the kneading channel 12.

The kneading channel 12 receives previously-crumbled curd from a first conveyor using augers 40, which is conventional, through a loading port 41 arranged at the inlet end 12a of the channel 12.

Figure 4:
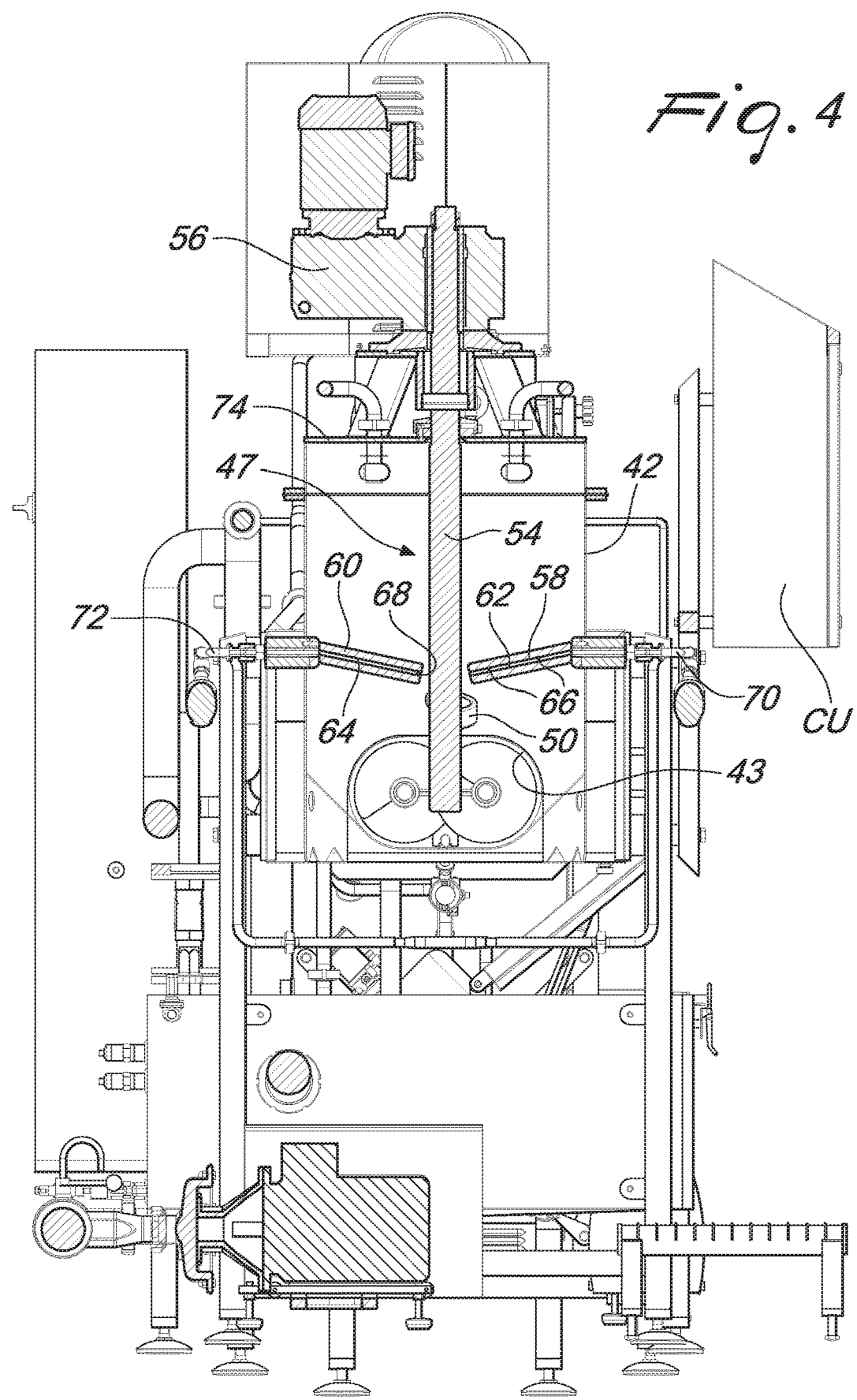
FIG. 4 is a cross-sectional view of taken along the line IV-IV FIG. 2.

The outlet end 12b of the channel 12 opens into a kneading chamber 42 through an inlet opening 43 (FIG. 4).

The kneading chamber 42 has a substantially cylindrical profile with a vertical axis. An outlet opening 44 arranged opposite the inlet opening 43 extends substantially for the entire height of the kneading chamber 42.

Through the outlet opening 44, the pulled curd is unloaded into a second conveyor using augers 45, which is conventional, for subsequent processing.

The unloading of the curd from the kneading chamber 42 can be choked by way of a guillotine sluice gate 46 interposed between the kneading chamber 42 and the second conveyor using augers 45.

The kneading chamber 42 accommodates a spindle 47 with a vertical axis.

The spindle 47 has three rotating arms 48, 50, 52 with an arc-like profile, which protrude at different heights from a driving shaft 54.

The driving shaft 54 is made to rotate by a second gearmotor protected by a housing 56, which is supported above the kneading chamber 42 externally thereto.

The rotating arms 48, 50, 52 cooperate in the action of kneading with a pair of straight fixed arms 58, 60. Such arms protrude inward from respective opposite sides of the kneading chamber 42, at a height such that they do not interfere with the path of the rotating arms 48, 50, 52.

The fixed arms 58, 60 have respective longitudinal channels 62, 64 with outputs 66, 68 for supplying steam to the kneading chamber 42. To this end, the longitudinal channels 62, 64 are connected to the steam source (not shown) by way of respective ducts 70, 72.

The kneading chamber 42 is closed in an upper region by a lid 74.

Valve means (not shown) control the supply of steam into the kneading channel 12 and into the kneading chamber 42.

The movement of the kneading augers 20, 22 and of the spindle 47, as well as the supply of the steam into the kneading channel 12 and/or into the kneading chamber 42, are managed by a control unit CU.

The machine described above operates as follows. The previously-crumbled curd is fed by the first conveyor using augers 40 into the kneading channel 12 through the loading port 41. The augers 20, 22, rotating in opposite directions, progressively push the curd toward the outlet end 12b of the channel and, at the same time, perform a preliminary kneading operation, predominantly by compression. In this phase steam is also fed into the channel 12 through the injectors 32, 34, so as to progressively heat the curd and make it stringy, i.e. plastic.

Steam heating, with respect to water heating, considerably reduces the quantity of water released into the kneading channel 12, with consequent increase of yield. Furthermore, by virtue of the slope of the kneading channel 12, any water released does not stagnate in the channel but flows downstream by gravity. This circumstance favors the uniform absorption of the water by all of the curd being processed in the kneading channel 12.

The injection of steam is automatically controlled by the control unit CU on the basis of the signal received from the thermal probe 39.

Any fraction of water that is not absorbed by the curd in the kneading channel 12 flows into the kneading chamber 42 where the curd, already partially processed by the augers 20, 22, is subjected to a finishing kneading by the spindle 47. The rotating arms 48, 50, 52 cooperate with the fixed arms 58, 60 in the kneading of the material. Simultaneously, steam is dispensed in a controlled manner through the outputs 66, 68 of the fixed arms 58, 60, so as to maintain the desired temperature and degree of moisture during processing.

In practice it has been found that the machine described herein is particularly effective in the production of relatively "dry" pulled curds, i.e., with a degree of moisture approximately less than 55%.

It has further been found that, with the apparatus according to the invention, the pulled curd retains substantially all the water used in kneading, so as to prevent drainage. Furthermore, the apparatus according to the invention is also advantageous from the point of view of energy consumption since, by virtue of the steam heating, it is no longer necessary to heat great quantities of water which, moreover, would need to be disposed of.

From the description it is clear that the apparatus according to the invention fully achieves the set aim of producing a pulled curd that is soft and with the desired degree of moisture without draining water, with consequent advantages in terms of yield and quality of production.

Furthermore, with respect to the apparatus known from EP 2473028 B1, the machine according to the invention is more compact and has lower manufacturing and energy consumption costs by virtue of a simpler mechanics of the kneading chamber.

Furthermore, the machine described herein is capable of operating continuously since the curd fed to the kneading chamber 42, having already been kneaded by the augers, requires only a finishing kneading which can be carried out without interrupting the feeding of the curd.

Obviously the preferred embodiment described herein of the kneading machine according to the invention is susceptible of wide-ranging modifications. For example, there can be variations in both the number and the arrangement of the rotating arms and of the fixed arms in the kneading chamber 42, and also in the number and the arrangement of the steam injectors both in the kneading channel and in the kneading chamber.

Furthermore, obviously, other controls can be provided, e.g., other temperature probes in the kneading chamber as well, in order to optimize control of the process.

Furthermore, although in the preferred embodiment the machine is equipped to operate only with steam, obviously water injectors could also be provided for operation with water or with a steam/water mixture.

The disclosures in Italian Patent Application No. 102016000026211 (UA2016A001606) from which this application claims priority are incorporated herein by reference.

What is claimed is:

1. A curd kneading machine comprising:
    a kneading channel, having an inlet end which is open to receive curd to be kneaded and an outlet end which is open to dispense said curd,
    a pair of mutually opposite motorized augers, which are supported side by side in the kneading channel, the pair of mutually opposite motorized augers being configured to be actuated to rotate in opposite directions to move said curd from said inlet end to said outlet end,
    first steam injector means, which are open in said kneading channel,
    at least one kneading chamber arranged at the outlet end of said kneading channel in order to receive the curd dispensed therefrom, and
    a motorized spindle with a vertical axis provided with at least one rotating arm protruding from a driving shaft of the motorized spindle, wherein the driving shaft extends along the vertical axis,
    wherein said kneading chamber accommodates the motorized spindle, said at least one rotating arm cooperating with at least one fixed arm that protrudes toward the inside of the kneading chamber at a non-interfering height.

2. The machine according to claim 1, further comprising second steam injector means which are open in said kneading chamber.

3. The machine according to claim 2, wherein said second steam injector means comprise channels which are provided in said at least one fixed arm and are connected to a steam source.

4. The machine according to claim 1, wherein said at least one fixed arm has a straight profile.

5. The machine according to claim 1, further comprising at least two of said fixed arms.

6. The machine according to claim 1, wherein said at least one rotating arm has an arc-like profile.

7. The machine according to claim 1, further comprising at least three of said rotating arms at different heights.

8. The machine according to claim 1, wherein said kneading channel is inclined downward from said inlet end to said outlet end by an angle comprised between 0.5° and 6°.

9. The machine according to claim 8, wherein said angle is equal to 1.5°.

10. The machine according to claim 1, further comprising sensor means which are arranged to detect the temperature in at least one between said kneading channel and said kneading chamber and are connected to a control unit which is programmed to adjust the operation of the machine as a function of the temperature detected by said sensor means.

\* \* \* \* \*